J. C. COVERT.
Improvement in Holdbacks for Harness.
No. 5,141. Reissued Nov. 12, 1872.
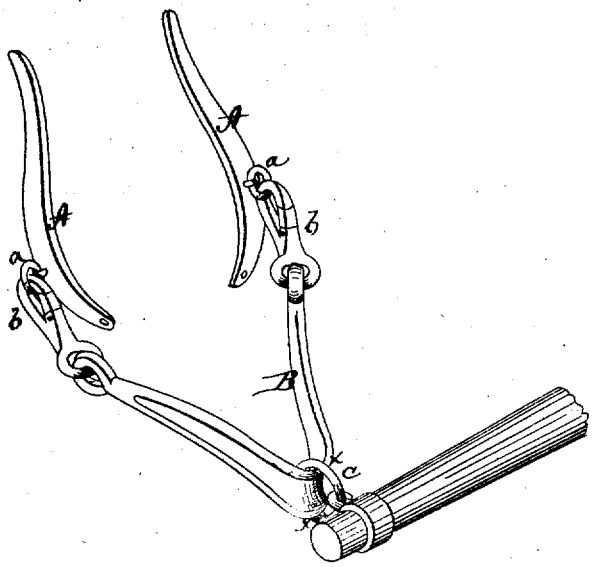
*Witness:*
Henry N. Miller
C. L. Everett
*Inventor.*
James C. Covert.
per Hayden Thurston
*Attorneys.*
AM. PHOTO-LITHOGRAPHIC CO. N.Y. (OSBORNES PROCESS.)

UNITED STATES PATENT OFFICE.

JAMES C. COVERT, OF TOWNSENDVILLE, NEW YORK.

IMPROVEMENT IN HOLD-BACKS FOR HARNESS.

Specification forming part of Letters Patent No. 69,412, dated October 1, 1867; reissue No. 5,141, dated November 12, 1872.

*To all whom it may concern:*

Be it known that I, JAMES C. COVERT, of Townsendville, Seneca county, New York, have invented a new and Improved Hold-Back; and I do hereby declare that the following is a full, clear, and exact description thereof, which will enable others skilled in the art to make and use the same, reference being had to the accompanying drawing forming a part of this specification, and which represents a perspective view of my invention.

Similar letters of reference indicate corresponding parts.

This invention relates to a metal hold-back to be attached to the hames, and which is connected by a ring to the neck-yoke, for the purpose of doing away with the breast-strap, and to facilitate the easy adjustment of the harness and the management of the vehicle. The invention consists chiefly in the shape of the hold-back, which is preferably made similar to the letter V, whereby the ring of the neck-yoke is more securely held in place and prevented from sliding on the hold-back, thus permitting greater facility in guiding the vehicle. The ends of the hold-back are secured to the rings in the harness by means of snap-hooks, which are suitably attached to the hold-back; and the hold-back can thus be easily secured to or removed from the harness.

A represents the hames made as usual. To the hames are attached rings or eyes *a a*, to which, by means of snap-hooks *b b*, the hold-back B is secured. The latter is made of malleable iron or other suitable metal, in the form of a V-shaped bar or otherwise, so that a depression or catching-point, *x*, is formed in the center of the bar, and into which the ring lies and cannot slide back and forth. The ring *c* is attached in any suitable manner to the end of the hold-back bar B, and will thus slip less thereon than on the usual or curved metallic hold-backs, and thus a more secure and complete guidance of the pole D will be effected.

The strap-hooks may be of any suitable construction, and are suitably attached to each end of the hold-back, so that they can be easily adjusted to the rings on the hames.

I claim as new and desire to secure by Letters Patent—

1. A V-shaped hold-back, constructed entirely of one piece of metal, with the catching-point *x* at its center, into which the ring on the neck-yoke lies and is held, substantially as herein set forth.

2. The combination of a metallic hold-back, B, constructed entirely of one piece of metal, and the snap-hooks *b b*, suitably attached to the ends of the hold-back bar, substantially as and for the purposes herein set forth.

In testimony that I claim the foregoing I have hereunto set my hand this 25th day of October, 1872.

JAMES C. COVERT.

Witnesses:
RD. A. HYDE,
HARRY C. SCOTT.